(12) United States Patent
Finateu et al.

(10) Patent No.: US 10,721,423 B2
(45) Date of Patent: Jul. 21, 2020

(54) PIXEL CIRCUIT FOR DETECTING TIME-DEPENDENT VISUAL DATA

(71) Applicants: PROPHESEE, Paris (FR); CONSEJO SUPERIOR DE INVESTIGACIONES CIENTIFICAS, Madrid (ES)

(72) Inventors: Thomas Finateu, Moret sur Loing (FR); Bernabé Linares Barranco, Seville (ES); Teresa Serrano Gotarredona, Seville (ES); Christoph Posch, Bad Fischau (AT)

(73) Assignees: PROPHESEE, Paris (FR); CONSEJO SUPERIOR DE INVESTIGACIONES CIENTIFICAS, Madrid (ES)

( * ) Notice: Subject to any disclaimer, the term of this patent is extended or adjusted under 35 U.S.C. 154(b) by 0 days.

(21) Appl. No.: 16/343,720

(22) PCT Filed: Oct. 19, 2017

(86) PCT No.: PCT/EP2017/076780
§ 371 (c)(1),
(2) Date: Apr. 19, 2019

(87) PCT Pub. No.: WO2018/073379
PCT Pub. Date: Apr. 26, 2018

(65) Prior Publication Data
US 2019/0273884 A1  Sep. 5, 2019

(30) Foreign Application Priority Data

Oct. 20, 2016 (EP) .................................. 16306380

(51) Int. Cl.
*H04N 5/374* (2011.01)
*H04N 5/335* (2011.01)
*H04N 5/3745* (2011.01)

(52) U.S. Cl.
CPC ........... *H04N 5/3745* (2013.01); *H04N 5/335* (2013.01)

(58) Field of Classification Search
CPC ............................. H04N 5/3745; H04N 5/335
See application file for complete search history.

(56) References Cited

U.S. PATENT DOCUMENTS 6,919,549 B2 * 7/2005 Bamji ...................... G01C 3/08
250/208.1
7,728,269 B2  6/2010 Lichtsteiner et al.
(Continued)

FOREIGN PATENT DOCUMENTS

WO  2004/093318 A2  10/2004
WO  2006/128315 A1  12/2006
WO  2015/036592 A1  3/2015

OTHER PUBLICATIONS

International Search Report and Written Opinion, dated Feb. 15, 2018, from corresponding PCT application No. PCT/EP2017/076780.

(Continued)

*Primary Examiner* — Shahbaz Nazrul
(74) *Attorney, Agent, or Firm* — Young & Thompson (57) ABSTRACT

A pixel circuit for detecting time-dependent visual data includes a photo sensing device detecting a light intensity and generating a signal representing the detected light intensity. The pixel circuit further includes: a voltage amplifier configured for amplifying the signal representing the detected light intensity and generating an amplified signal, the amplified signal being generated by taking into account a control signal which shifts an input voltage offset of the voltage amplifier; a hysteresis comparing module configured for comparing the amplified signal to at least one threshold value and to a reference value and for generating at least one output signal based on the comparison; and a feedback (Continued)

control module configured for generating the control signal of the voltage amplifier based on the at least one output signal generated by the hysteresis comparing module.

20 Claims, 2 Drawing Sheets

(56) References Cited

U.S. PATENT DOCUMENTS

| | | | |
|---|---|---|---|
| 9,935,618 B1* | 4/2018 | Fenigstein | H03K 3/3565 |
| 9,967,479 B2 | 5/2018 | Matolin et al. | |
| 2016/0227135 A1* | 8/2016 | Matolin | H04N 5/335 |
| 2016/0309099 A1* | 10/2016 | Yeh | H04N 5/361 |
| 2018/0098003 A1 | 4/2018 | Matolin et al. | |

OTHER PUBLICATIONS

Delbruckl, "Neuromorophic vision sensing and processing", ESSCIRC Conference 2016: 42nd European Solid-State Circuits Conference, IEEE, 2016, pp. 7-14, XP032980798.

Posch et al., "A QVGA 143 dB Dynamic Range Frame-Free PWM Image Sensor With Lossless Pixel-Level Video Compression and Time-Domain CDS", IEEE Journal of Solid-State Circuits, 2011, pp. 259-275, vol. 46, No. 1, XP055185382.

Brandli et al., "A 240×180 130 dB 3 μs Latency Global Shutter Spatiotemporal Vision Sensor", IEEE Journal of Solid-State Circuits, 2014, pp. 2333-2341, vol. 49, No. 10, XP011559757.

* cited by examiner

PIXEL CIRCUIT FOR DETECTING TIME-DEPENDENT VISUAL DATA

The present invention concerns a pixel circuit for detecting time-dependent visual data comprising a photo-sensing device.

It also concerns a vision sensor comprising a plurality of pixel circuits.

In image or video processing systems, image sensors acquire visual information which is processed in order to reconstruct images.

A classic image or video processing system comprises an array of photo-sensors or photo-array, each photo-sensor of the array acquiring visual information for each pixel of a frame.

In other image or video processing systems which are better suited for real-time artificial vision, only data representing a change in visual information with respect to visual information previously acquired is processed. It may be noted that sensors used in such image or video processing system do not provide images or frames, and have been referred to in the literature as frame-free vision sensors.

Document WO2006/128315 describes a photo-array for detecting time-dependent visual data. The photo-array comprises an array of cells or pixel circuits, each cell comprising a photo-sensor generating a signal representing the light intensity at the cell. A cell only generates output data to be processed when a change occurs in the light intensity detected by the photo-sensor.

In particular, in order to determine whether a change in the light intensity has occurred, the signal representing the light intensity at a cell is fed to a switched capacitor amplifier, the voltage at the output of the switched capacitor amplifier being fed to a threshold detector. The threshold detector only generates an output signal or pixel event when the voltage at its input exceeds a threshold value. Thus, in that case the threshold detector generates an event in output signal form.

Once the output signal (or pixel event) has been generated, it is sent to peripheral communication circuits. These peripheral communication circuits send, after arbitration of signals from different pixel circuits, an acknowledge signal back to the pixel circuit. The acknowledge signal is used by the pixel circuit to reset the pixel circuit and thus prepare it for a new event cycle, i.e. to detect a new event and to generate a new output signal (or pixel event) representing a new change in light intensity at the cell.

In more detail, the switched capacitor amplifier comprises two capacitors which are charged as a function of the signal representing the light intensity at the cell generated by the photo-sensor. After detecting an event, one of the capacitors is discharged by virtue of the reset signal in order to reset the cell such that a next change in light intensity or event may be detected.

Even if the performance of such a cell or pixel circuit is good, an acknowledge signal from the peripheral communication circuits is necessary for resetting the pixel circuit, and waiting for the reception of such a signal produces a delay in resetting the pixel circuit. Thus, from the instant when the output signal is generated to the instant when the pixel circuit is reset, some information may be lost. In addition, the delay introduced by waiting for the acknowledge signal may be different depending on the quantity of data or traffic in the peripheral communication circuits.

The present invention is directed to providing a pixel circuit making it possible to improve the detection of successive changes in light intensity.

To that end, according to a first aspect, the present invention concerns a pixel circuit for detecting time-dependent visual data comprising a photo sensing device detecting a light intensity and generating a signal representing the detected light intensity.

According to the invention, the pixel circuit further comprises:

a voltage amplifier configured for amplifying the signal representing the detected light intensity and generating an amplified signal, the amplified signal being generated by taking into account a control signal which shifts an input voltage offset of said voltage amplifier, a hysteresis comparing module configured for comparing the amplified signal to at least one threshold value and to a reference value and for generating at least one output signal based on said comparison, and a feedback control module configured for generating said control signal of said voltage amplifier based on said at least one output signal generated by said hysteresis comparing module.

Thus, the voltage amplifier, the hysteresis comparing module and the feedback control module operate in such a way that the control signal which is generated by the feedback control module has an effect on the input voltage offset of the voltage amplifier. The input voltage offset is thus modified, i.e. increased or decreased, and the amplified signal at the output of the voltage amplifier is modified (decreased or increased).

Thus, the control signal of the voltage amplifier which is generated by the feedback control module, influences the level of the amplified signal.

Therefore, the level of the amplified signal may be controlled by the pixel circuit itself without the necessity of any external circuit.

As a consequence, the pixel circuit may be reset without supplementary delays introduced by external circuits and the pixel circuit is quickly ready for detecting new events without losing information.

According to a feature, the hysteresis comparing module is configured for setting said at least one output to an active state (either 'charge up' or 'charge down') if said amplified signal exceeds said at least one threshold value (either θo+, or θo−).

Thus at least one output is generated at an active state when the light intensity is such that the amplified signal exceeds the at least one threshold value.

According to another feature, when said at least one output is at an active state, the feedback control module is configured for modifying said control signal such that the amplified signal reaches the reference value.

Thus, when the at least one output is generated at an active state, the control signal is modified.

Therefore, when the amplified signal exceeds the at least one threshold value, the control signal is generated by the hysteresis comparing module and the feedback control module such that the amplified signal is increased or decreased until it reaches a reference level, for example 0. The pixel circuit at this instant can be considered as reset and is ready for detecting a new change in the light intensity.

In other words, once an event has been detected, i.e. once the light intensity is such that the amplified signal exceeds the at least one threshold value, the pixel circuit is brought back to an initial instant (or reset instant), after which it is ready to detect another event in an autonomous manner.

According to a feature, the active state is a charge-up state if the amplified signal exceeds a first threshold value, or if the amplified signal exceeds a second threshold value.

Thus, either the charge-up state or the charge-down state modifies the control signal such that the amplified signal decreases or increases respectively until it reaches the reference value, for example 0.

It may be noted that the at least one output is set to an active state, the active state being a charge-up state or a charge-down state depending on the gain of the voltage amplifier Thus, when the voltage amplifier has a positive gain, the active state is a charge-up state if the amplified signal exceeds the first threshold value, and when the voltage amplifier has a negative gain, the active state is a charge-down state if the amplified signal exceeds the second threshold value.

According to another feature, the active state is a charge-down state if said amplified signal exceeds a second threshold value, or if the amplified signal exceeds a first threshold value.

Thus, either the charge-down state or charge-up state modifies the control signal such that the amplified signal increases or decreases respectively until it reaches the reference value, for example 0.

In particular, when the voltage amplifier has a positive gain, the active state is a charge-down state if the amplified signal exceeds the first threshold value, and if the voltage amplifier has a negative gain, the active state is a charge-down state if the amplified signal exceeds the second threshold.

Therefore, the two active states ("charge up state" and "charge down state") bring the amplified signal to the reference value, i.e. bring the pixel back to a starting instant which can also be called a "reset instant".

According to a feature, the feedback control module comprises a capacitor which is charged depending on the at least one output signal, said control signal of the voltage amplifier being generated as a function of the charge of said capacitor.

Thus, the level of the control signal depends on the charge of the capacitor, the offset of the voltage amplifier being shifted by a value depending on the charge of the capacitor.

Therefore, the high gain region of the amplifier is shifted as a function of the charge of the capacitor which is based on the output signal.

In particular, the capacitor is charged up or down when the at least one output is at an active state.

According to a feature, a feedback control module comprises at least a current source which is activated by the at least one output signal, said capacitor being charged by said at least one current source.

Thus, the at least one output signal controls the rate of increment or decrement of the charge of the capacitor by activating and deactivating the at least one current source.

According to a feature, said voltage amplifier comprises at least a first and a second stack of transistors each formed by a plurality of diode-connected transistors and an additional transistor, the additional transistor of said first stack of transistors receiving said signal representing the light intensity and the amplified signal being taken from a terminal of the additional transistor of said second stack of transistors.

It may be noted that the voltage gain of the voltage amplifier depends on the number of the diodes in the stacks.

According to this embodiment, the amplified signal at the output of the voltage amplifier is taken in a single-ended way in order to be sent to the hysteresis comparing module.

By taking the output in a single-ended way, the amplified signal corresponds to the voltage at a terminal of the additional transistor of the second stack of transistors.

According to another feature, said voltage amplifier comprises a plurality of stacks of transistors formed respectively by a plurality of diode-connected transistors and an additional transistor, the additional transistor of a first stack of transistors receiving said signal representing light intensity and the amplified signal being taken from a terminal of the additional transistor of a second stack of transistors and a third stack of transistors respectively.

According to this embodiment, the amplified signal at the output of the voltage amplifier is taken in a differential way in order to be sent to the hysteresis comparing module.

By taking the output in a differential way, the amplified signal corresponds to the difference between the voltage at a terminal of the additional transistor of second and third stacks of transistors respectively.

By virtue of this feature, the effective gain of the voltage amplifier is higher.

According to a feature, the photo-sensing device comprises a photodiode generating a current, and a logarithmic converter configured for transforming said current into said signal representing the detected light intensity.

According to an embodiment, the hysteresis comparing module comprises at least a hysteresis comparator, the at least one output signal corresponding to an output of the hysteresis comparator.

Thus, the at least one hysteresis comparator compares the amplified signal to at least one threshold value and if the level of the amplified signal passes the threshold value the at least one output signal is set to the active state. The active state indicates that an event has occurred, i.e. that the light intensity has changed with respect to a previously detected one.

According to another embodiment, the hysteresis comparing module comprises at least a hysteresis comparator and a logic module, said at least one output signal corresponding to an output of said logic module.

Thus, the output of the hysteresis comparison module is based on the output of the at least one hysteresis comparator.

According to a feature, the hysteresis comparing module comprises a first hysteresis comparator and a second hysteresis comparator, the first hysteresis comparator being configured for comparing the amplified signal to a first threshold value and generating based on said comparison a first output signal at an active state if the level of the amplified signal is equal to or greater than the first threshold value, and the second hysteresis comparator being configured for comparing the amplified signal to a second threshold value and generating a second output signal at an active state if the level of the amplified signal is equal to or lower than the second threshold value.

The pixel circuit detects a change in the light intensity with respect to the first and the second threshold values, a change being detected when the amplified signal exceeds one of two threshold values.

Therefore, when the amplified signal is equal to or lower than the first threshold value and equal to or greater than the second threshold value, no change in the light intensity is detected.

According to a feature, the feedback control module comprises two current sources which are respectively activated based on said first output signal and said second output signal.

Thus, according to whether a change in relative light intensity beyond a threshold is detected or not, current sources are activated or not.

According to a feature, the current sources are activated when the output signal is at an active state.

Therefore, when an event or relative change in the light intensity beyond a threshold is detected, the current source is activated in order to progressively charge the capacitor and to shift the input offset of the voltage amplifier.

According to a second aspect, the present invention concerns a vision sensor comprising a plurality of pixel circuits according to the invention.

The advantages and particular features of the frame-free vision sensor are similar to those of the pixel circuit.

Figure 1:
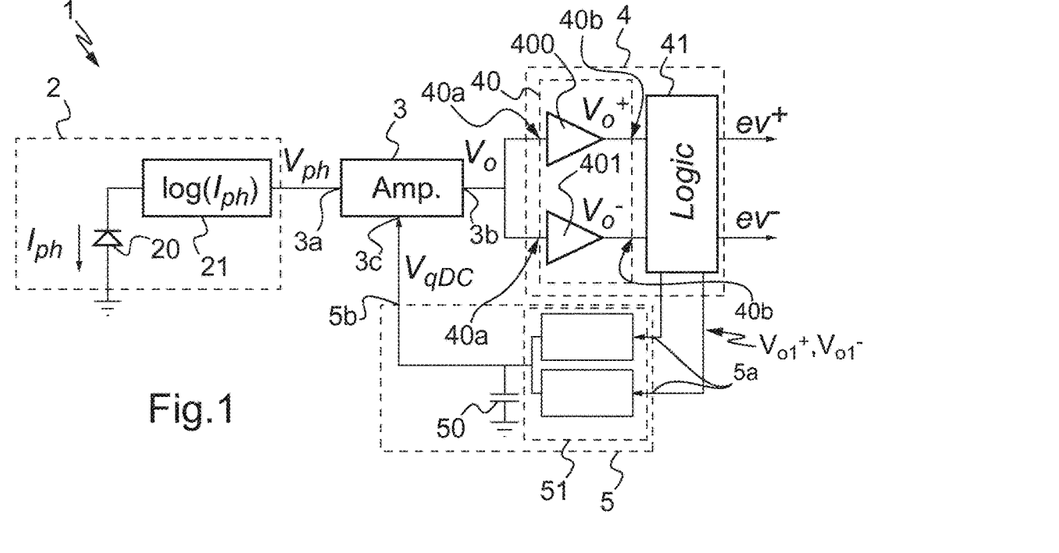
FIG. 1 represents a schematic block diagram of a pixel circuit according to the invention.

Still other particularities and advantages of the invention will appear in the following description, made with reference to the accompanying drawings which are given by way of non-limiting example, and in which:

FIG. 1 illustrates schematically a pixel circuit according to the invention.

A pixel circuit corresponds to a cell, a plurality of pixel circuits or cells being grouped in an array or photo-array in order to form a vision sensor.

As described above, the pixel circuit 1 according to the invention is configured for detecting time-dependent visual data. The pixel circuit 1 comprises a photo-sensing device 2 which detects the intensity of the light at the pixel circuit 1. The photo-sensing device 2 further generates a signal representing the light intensity $V_{ph}$ which it has detected.

According to an embodiment, the photo-sensing device 2 comprises a photodiode 20 generating a current $I_{ph}$. The value of the current $I_{ph}$ is a function of the light intensity at the pixel circuit 1.

According to the described embodiment, the photo-sensing device 2 comprises a logarithmic converter 21 configured for transforming the generated current $I_{ph}$ into the signal representing the detected light intensity $V_{ph}$.

In particular, the logarithmic converter 21 converts the current $I_{ph}$ into the signal representing the detected light intensity $V_{ph}$, each value of this voltage signal $V_{ph}$ being proportional to the logarithm of the value of the current $I_{ph}$.

Examples of circuits of a logarithmic converter may be described below with reference to FIGS. 3a and 3b.

The pixel circuit 1 further comprises a voltage amplifier 3. The voltage amplifier 3 comprises an input 3a, an output 3b and a control input 3c. The voltage amplifier 3 receives, at its input 3a, the signal representing the detected light intensity $V_{ph}$ generated by the photo-sensing device 2 and generates at its output 3b an amplified signal $V_o$.

The voltage amplifier 3 receives at its control input 3c a control signal $V_{qDC}$, which shifts an input voltage offset of said voltage amplifier 3.

The amplified signal $V_o$ is generated by taking into account the control signal $V_{qDC}$.

Figure 4:
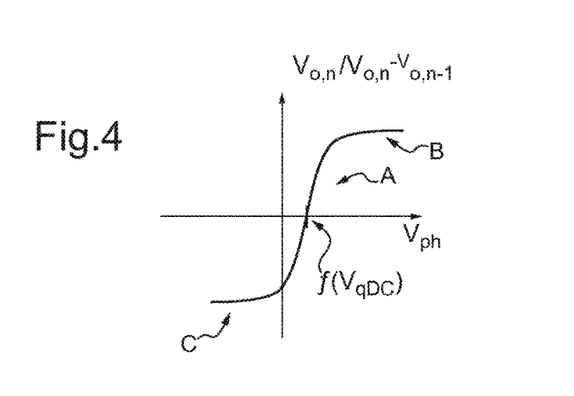
FIG. 4 represents a transfer function of the voltage amplifier of FIGS. 1 and 2, and FIGS. 5a and 5b represent outputs of the hysteresis comparators of FIGS. 1 and 2.

A transfer function of the voltage amplifier 3 is represented by FIG. 4. This Figure represents the relation between the input $V_{ph}$ of the amplifier module 3 and the output $V_o$, the output $V_o$ being either a single output ($V_{o,n}$) or a differential output ($V_{o,n} - V_{o,n-1}$), n representing a stage of the amplifier module 3.

As represented by FIG. 4, the amplifier module 3 has a first region A of high gain which corresponds to a region situated around the value $f(V_{qDC})$ and two saturation regions B, C without any gain.

Variations on control signal $V_{qDC}$ shift the high gain region A along the X-axis in order to track the signal $V_{ph}$ at the input of the amplifier module 3.

The amplified signal $V_o$ at the output 3b is fed to a hysteresis comparing module 4.

The hysteresis comparing module 4 is configured for comparing the amplified signal $V_o$ to at least one threshold value θo+, θo−, and to a reference value $V_{ref}$, for example 0. The hysteresis comparing module 4 is further configured for generating at least one output signal $V_{o1}+$, $V_{o1}-$, based on said comparisons.

Figure 5A:
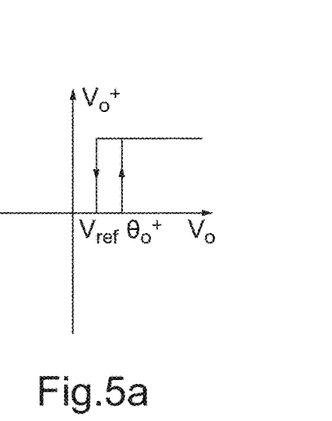
Figure 5B:
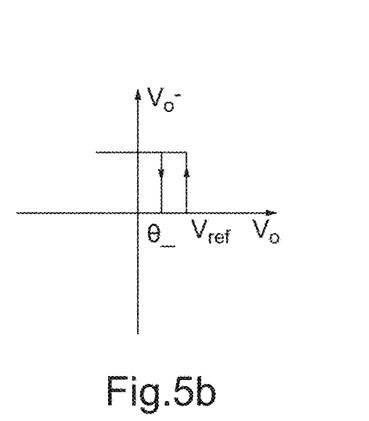

FIGS. 5a and 5b represent respectively the output of hysteresis comparators 400, 401, represented by FIG. 1, as a function of the input (the amplified signal $V_o$).

In FIG. 5a, when the amplified signal $V_o$ reaches the first threshold θo+, the output signal is at a value such that the control signal $V_{qDC}$ increases (when the gain of the voltage amplifier 3 is positive) or decreases (when the gain of the voltage amplifier 3 is negative), making the amplified signal $V_o$ decrease or increase respectively until it reaches a reference value $V_{ref}$ (0 in this example).

Before the amplified signal $V_o$ reaches the first threshold value θo+, while the amplified signal $V_o$ is between the first threshold θo+ and the reference value $V_{ref}$, the output signal Vo+ is a fixed value and the control output $V_{qDC}$ is stable.

After the amplified signal $V_o$ has reached the first threshold value θo+, while the amplified signal $V_o$ is between the first threshold value θo+ and the reference value $V_{ref}$, the output signal Vo+ is in an active state making $V_{qDC}$ change until Vo reaches the reference value.

FIG. 5b is equivalent to FIG. 5a but concerning a hysteresis comparator 401 comparing the amplified signal $V_o$ to the second threshold value θo−. While the amplified signal $V_o$ is between the second threshold value θo− and the reference value $V_{ref}$ (before the amplified signal $V_o$ reaches the second threshold value θo−, the output signal Vo+ has a fixed value and the control output $V_{qDC}$ is stable. When the amplified signal $V_o$ reaches the second threshold value θo− (while the amplified signal $V_o$ is between the second threshold value θo− and the reference value $V_{ref}$), the output signal Vo+ is at a value such the control signal $V_{qDC}$ is decreasing (when the voltage amplifier 3 gain is positive) or increasing (when the voltage amplifier 3 gain is negative) and the amplified signal is increasing or decreasing respectively until it reaches the reference value $V_{ref}$.

The hysteresis comparing module 4 comprises a comparing device 40 and a logic module 41. The comparing device 40 compares the amplified signal $V_o$ at its input 40a to at least one threshold value θo+, θo− and generates at its output 40b at least one intermediate output signal $V_o+$, $V_o-$ based on the result of the comparison. The logic module 41 receives the at least one intermediate output signal $V_o+$, $V_o-$ of the comparing device 40 and generates at least one output signal $V_{o1}+$, $V_{o1}-$.

The logic module 41 further generates at least one event signal ev+, ev− representing that an event has occurred, i.e. that the intensity of the light at the pixel circuit 1 has changed by a given relative amount.

The functioning of the pixel circuit will be described with reference to FIG. 2.

Figure 2:
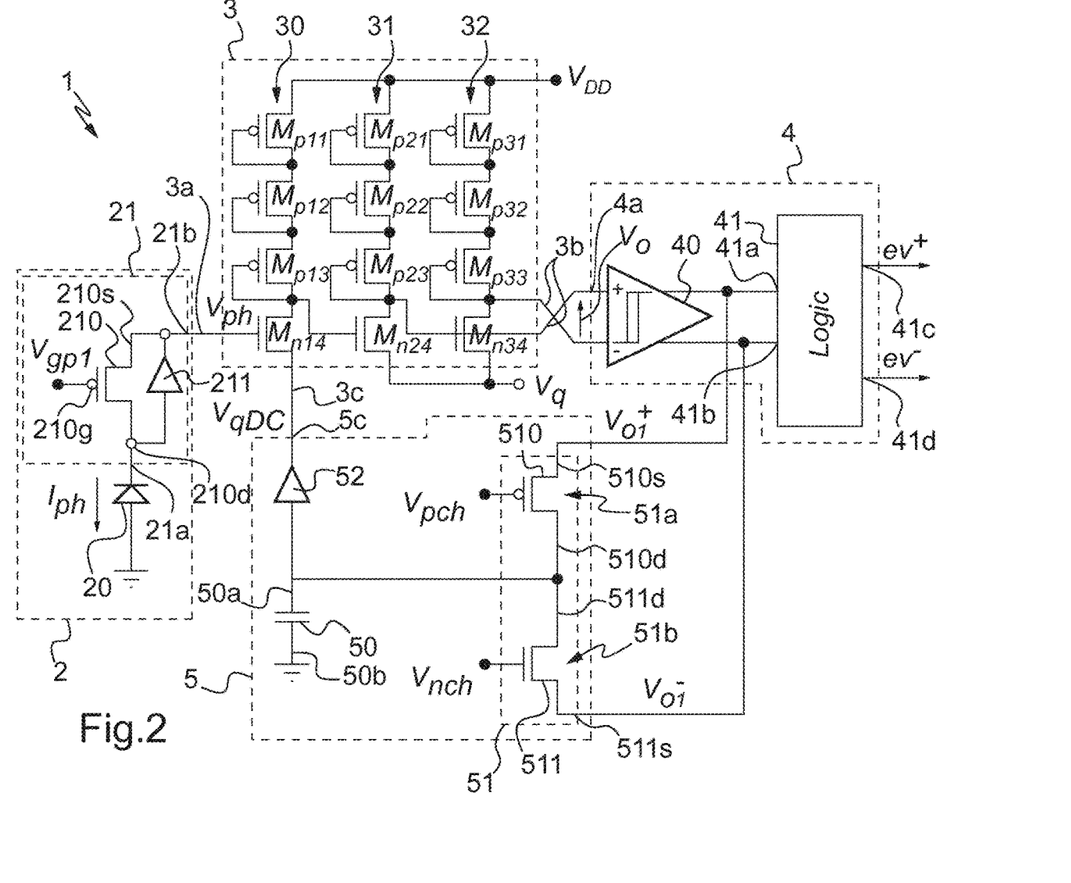
FIG. 2 represents a schematic diagram of a pixel circuit according to a first embodiment.

It may be noted that the diagram represented by FIG. 2 corresponds to a possible embodiment for implementing the block diagram represented by FIG. 1. This block diagram may be implemented according to other embodiments.

The pixel circuit 1 further comprises a feedback control module 5 configured for generating the control signal $V_{qDC}$ of the voltage amplifier 3.

The feedback control module 5 receives the at least one output signal $V_{o1}+$, $V_{o1}-$ at its input 5a and generates the control signal $V_{qDC}$ at its output 5b. The control signal $V_{qDC}$ is changed at a constant rate or kept constant based on the value of the at least one output signal $V_{o1}+$, $V_{o1}-$ generated by the hysteresis comparing module 4.

In particular, the control signal $V_{qDC}$ is generated such that when the amplified signal passes the at least one threshold value, VqDC will increase or decrease, for example at a constant rate.

It may be noted that when the intensity of the light at the pixel circuit changes above a threshold (i.e. that an event occurs), the amplified signal exceeds a threshold value. In such a case, the control signal $V_{qDC}$ is modified such that the input voltage offset of said voltage amplifier 3 is shifted in order to bring the amplified signal $V_o$ to a reference value, for example zero.

In this embodiment, the control signal $V_{qDC}$ is modified at a constant rate. When the amplified signal $V_o$ reaches the reference value $V_{ref}$, the hysteresis comparator module 4 sets its corresponding output $V_{o+}$, $V_{o-}$; $V_{o1+}$, $V_{o1}-$ to an inactive state (named "hold state"). In this inactive state or hold state, the control signal $V_{qDC}$ is kept constant (until a next event).

According to an embodiment, the hysteresis comparing module 4 sets the at least one output $V_{o1}+$, $V_{o1}-$ to an active state if the amplified signal $V_o$ passes said at least one threshold.

On the contrary, if the amplified signal does not pass (i.e. no event occurs) at least one threshold value, the at least one output $V_{o1}+$, $V_{o1}-$ is generated at an inactive state.

According to an embodiment, the hysteresis comparing module 4 is configured for comparing the amplified signal $V_o$ with two threshold values $\theta o+$, $\theta o-$.

A first threshold value $\theta o+$ is a minimum positive value representing that the intensity of the light has changed. When the amplified signal Vo passes, i.e. is greater than, a first threshold value $\theta o+$, the hysteresis comparing module 4 considers that the light intensity has changed by a pre-set relative amount. When the value of the amplified signal $V_o$ does not exceed, i.e. is equal or lower than, the first threshold value $\theta o+$, the hysteresis comparing module 4 considers that the intensity of the light has not changed by the pre-set relative amount.

A second threshold value $\theta o-$ is a minimum negative value representing that the intensity of the light has changed by a pre-set relative amount. When the amplified signal $V_o$ passes, i.e. is lower than a second threshold value $\theta o-$, the hysteresis comparing module 4 considers that the light intensity has changed by the pre-set relative amount. When the value of the amplified signal $V_o$ does not exceed, i.e. is equal or lower than the second threshold value $\theta o-$, the hysteresis comparing module 4 considers that the intensity of the light has not changed by the pre-set relative amount.

Of course, according to other embodiments, the hysteresis comparing module may consider that a change in light intensity has occurred when either the amplified signal is equal to or greater than the first threshold value or equal or lower than the second threshold value.

It may be noted that according to the described embodiment, the amplified signal $V_o$ reaches the first threshold value $\theta o+$ when the light intensity increases with respect to a previously detected one. The amplified signal $V_o$ reaches the second threshold value $\theta o-$ when the light intensity decreases with respect to a previously detected one.

Of course, the first $\theta o+$ and the second $\theta o-$ threshold value may be used inversely, that is the first threshold value as minimum positive value and the second threshold value as minimum negative value.

According to an embodiment, the hysteresis comparing module 4 comprises a first hysteresis comparator 400 configured for comparing the amplified signal $V_o$ to a first threshold value $\theta o+$ and generating based on said comparison a first output signal $V_{o1}+$ at an active state if the level of the amplified signal is equal to or greater than the first threshold value $\theta o+$.

The hysteresis comparing module 4 further comprises a second hysteresis comparator 401 configured for comparing the amplified signal to a second threshold value $\theta o-$ and generating a second output signal $V_{o1}-$ at an active state if the level of the amplified signal is equal or lower than the second threshold value $\theta o-$.

The first hysteresis comparator 400 and the second hysteresis comparator 401 further compare the amplified signal $V_o$ to a reference value $V_{ref}$, for example 0.

According to the described embodiment, the feedback control module 5 is configured for modifying the control signal $V_{qDC}$ when the at least one output $V_{o1}+$, $V_{o1}-$ is at an active state.

Thus, when an event has occurred, the control signal $V_{qDC}$ is modified such that the offset of the voltage amplifier 3 is modified and the amplified signal $V_o$ is thus modified such that it approaches a reference value $V_{ref}$, for example zero.

The feedback control module 5 comprises a capacitor 50 which is charged depending on the at least one output signal $V_{o1}+$, $V_{o1}-$.

The feedback control module 5 further comprises a charge pumping device 51 receiving the at least one output signal $V_{o1}+$, $V_{o1}-$, from the hysteresis comparing module 4 and charging the capacitor 50 as a function of the value of the at least one output signal $V_{o1}+$, $V_{o1}-$.

The feedback control module 5 generates the control signal $V_{qDC}$ of the voltage amplifier 3 as a function of the charge of the capacitor 50.

FIG. 2 illustrates a schematic diagram of a pixel circuit 1 according to a first embodiment.

In this Figure, the photo-sensing device 2, the voltage amplifier 3, the hysteresis comparing module 4 and the feedback control module 5 are illustrated in more detail.

As described above, the photo-sensing device 2 comprises a photodiode 21 and a logarithmic converter 21 connected together.

According to this embodiment, the photodiode 20 is connected to an input 21a of the logarithmic voltage converter 21. The logarithmic voltage converter 21 generates the signal representing the light intensity $V_{ph}$ at the output 21b.

The logarithmic voltage converter 21 comprises a transistor 210 and an amplifier 211 connected in parallel. According to the described embodiment, the transistor 210 is a PMOS transistor, its drain 210d and source 210s being connected to the input and the output of the amplifier 211 respectively. A bias voltage Vgp1 is applied to the gate 210g of the transistor 210.

This structure of converter is compact and presents an optimum speed response.

According to other embodiments, the structure of the logarithmic converter 21 may be different. FIGS. 3a and 3b represent two examples of logarithmic voltage converters 21' 21" that may be used in a pixel circuit 1 according to the invention. Other logarithmic converters may be used in the pixel circuit.

Figure 3A:
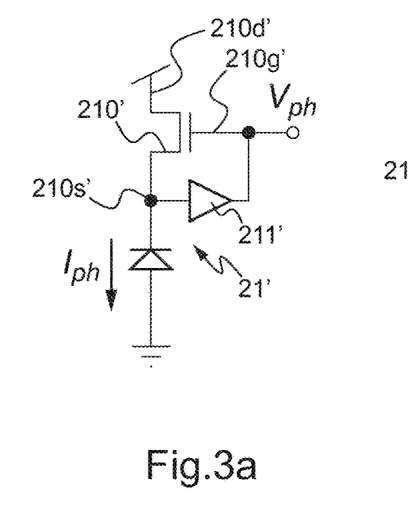
FIGS. 3a and 3b represent schematic diagrams of logarithmic converters according to embodiments.

In FIG. 3a, the transistor 210' is an NMOS transistor, and the amplifier 211' is connected between the gate 210g' and the source 210s', the output of the logarithmic voltage converter 21' being taken at the gate 210g' of the transistor 210'.

Figure 3B:
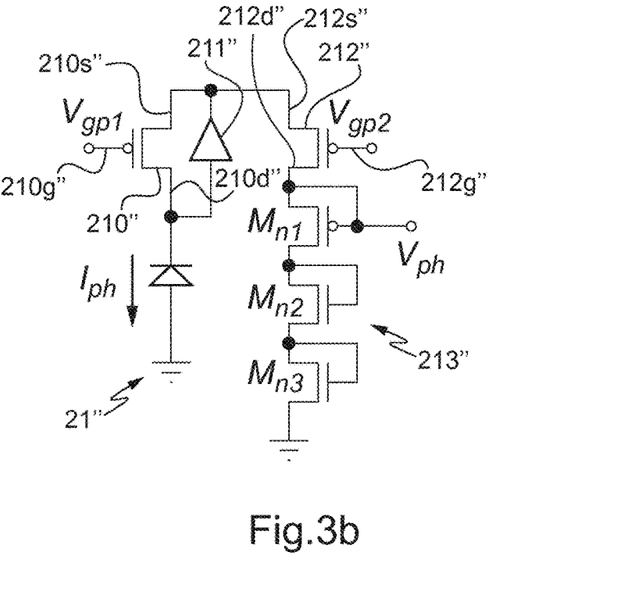

FIG. 3b represents another example of a logarithmic voltage converter 21". This logarithmic voltage converter 21" comprises a transistor 210" (a PMOS transistor in this example) and an amplifier 211" connected as in the logarithmic voltage converter 21 represented by FIG. 2. In addition, the logarithmic voltage converter 21" represented by FIG. 3b comprises a second transistor 212" and a group of diode-connected MOS 213" connected in cascade.

In this example, the second transistor 212" PMOS transistor, its source 212s" is connected to the source 210s" of the first transistor 210" and its drain 212d" is connected to the group of diode-connected MOS 213".

In this example, the group of diode-connected MOS 213" comprises three NMOS transistors $M_{n1}$, $M_{n2}$, $M_{n3}$, the output $V_{ph}$ of the logarithmic voltage converter 21" being taken at the gate of a first transistor $M_{n1}$ of the group of diode-connected MOS 213".

This logarithmic voltage converter 21" provides a greater amplification of the signal applied at its input.

Returning back to FIG. 2, the voltage amplifier 3 according to the represented embodiment comprises a plurality of stacks of transistors 30, 31, 32. In this example, the voltage amplifier 3 comprises three stacks. However, the number of stacks of transistors may be different.

Each stack of transistors 30, 31, 32 is formed by a plurality of diode-connected transistors $M_{pij}$ and an additional transistor $M_{nij}$, i being an index representing the order of the stack in the voltage amplifier 3, and j being an index representing the order of the transistor in the stack.

Thus, in the represented embodiment, a first stack of transistors 30 comprises three diode-connected transistors $M_{p11}$, $M_{p12}$, $M_{p13}$ and an additional transistor $M_{n14}$, a second stack of transistors 31 comprises three diode-connected transistors $M_{p21}$, $M_{p22}$, $M_{p23}$ and an additional transistor $M_{n24}$, and a third stack of transistors 32 comprises three diode-connected transistors $M_{p31}$, $M_{p32}$, $M_{p33}$ and an additional transistor $M_{n34}$.

Of course, the number of stacks of transistors and the number of transistors in each stack may be different.

In the represented example, the diode-connected transistors $M_{pij}$ are PMOS transistors and the additional transistors $M_{nij}$ are NMOS transistors. However, in other structures of voltage amplifiers, the diode-connected transistors may be of PMOS type and the additional transistors of NMOS type, or all transistors may be PMOS or NMOS.

In addition, in this example, the structure of all the stacks of transistors is similar. However, in other embodiments (not described and not represented) the structure of each stack may be different, i.e. some stacks having a number of transistors or a type of transistors different from other stacks.

In the represented example, the signal representing the light intensity $V_{ph}$ is applied to the gate of the additional transistor $M_{n14}$ of the first stack of transistors 30.

The voltage amplifier 3 generates at its output an amplified signal $V_o$. In this embodiment, the amplified signal $V_o$ is taken differentially at the drain of the additional transistors $M_{n24}$, $M_{n34}$ of the second 31 and the third 32 stacks of transistors.

According to another embodiment (not shown in the Figures), the voltage amplifier output may be single ended. In this case, the amplified signal is taken at the drain of an additional transistor.

In the represented example, a positive power supply $V_{DD}$ is applied to the stacks of transistors 30, 31, 32, and in particular to a first transistor $M_{pi1}$ of each stack of transistors 30, 31, 32.

The control input 3c of the voltage amplifier 3a corresponds in this example to the source of the additional transistor $M_{n14}$ of the first stack of transistors 30. The control signal $V_{qDC}$ is applied to the control input 3c.

As described above, the control signal $V_{qDC}$ shifts an input voltage offset of the voltage amplifier 3. Thus, the amplified signal $V_o$ is generated at the output 3b as a function of the signal at the input 3a (the signal representing the detected light intensity $V_{ph}$) and the control signal $V_{qDC}$ at the control input 3c.

The sources of the additional transistors $M_{ni4}$ of the second and third control stacks 31, 32 are connected to a voltage $V_q$. The voltage $V_q$ is a common low impedance reference voltage $V_q$ to which all the pixels are set.

The amplified signal $V_o$ is applied to an input 4a of the hysteresis comparing module 4. In this embodiment, the hysteresis comparing module 4 generates a first output signal $V_{o1}+$ and a second output signal $V_{o1}-$.

In the described embodiment, the hysteresis comparing module 4 comprises a hysteresis comparator 40. The input 4a of the hysteresis comparing module 4 corresponds to the input of the hysteresis comparator 40.

The hysteresis comparator 40 compares the amplified signal $V_o$ to a first threshold value θo+. Based on this comparison, the hysteresis comparator 40 generates a first intermediate output signal $V_o+$. In this embodiment, the first intermediate output signal $V_o+$ corresponds to the first output $V_{o1}+$ of the hysteresis comparing module 4.

The hysteresis comparator 40 further compares the amplified signal $V_o$ to a second threshold value θo−. Based on this comparison, the hysteresis comparator 40 generates a second intermediate output signal $V_o-$. In this embodiment, the second intermediate output signal $V_o-$ corresponds to the second output $V_{o1}-$ of the hysteresis comparing module 4.

The hysteresis comparator 40 sets the first output signal $V_o+$ (or first intermediate output signal $V_{o1}+$) at an active state if the level of the amplified signal is equal to or greater than the first threshold value θo+.

In addition, the hysteresis comparator 40 sets the second output signal $V_o-$ (or second intermediate output signal $V_{o1}-$) at an active state if the level of the amplified signal is equal to or lower than the second threshold value θo−.

It may be noted that the hysteresis comparator 40 is equivalent to two hysteresis comparators 400, 401 as represented by FIG. 1.

According to the described embodiment, the hysteresis comparing module 4 further comprises a logic module 41. The logic module 41 comprises two inputs 41a, 41b and two outputs 41c, 41d.

The first intermediate output $V_{o1}+$ and the second intermediate output signal $V_{o1}-$ of the hysteresis comparator 40 (corresponding respectively in this embodiment to the first output $V_o+$ and the second output $V_o-$ of the hysteresis comparing module 4) are applied respectively to the first input 41a and the second input 41b of the logic module 41. The logic module 41 generates a first event signal ev+ if the first output signal $V_o+$ is at an active state, and a second event signal ev− if the second output signal $V_o-$ is at an active state.

For example, the first ev+ and second ev− event signal are an impulsion. Thus, an impulsion is generated when the amplified signal $V_o$ passes the first threshold value θo+ or the second threshold value θo−.

The first ev+ and second ev− event signal are transmitted to the peripheral communication circuits.

According to another embodiment (not represented by the Figures), the logic module generates the first output signal and the second output signal of the hysteresis comparing module. These output signals are generated by the logic module based on the output of the hysteresis comparator.

The feedback control module 5 according to this embodiment comprises a charge pumping module 51. In the described embodiment, the charge pumping module 51 comprises two current sources 51a, 51b. A first current source 51a receives the first output signal $V_{o1}$+ generated by the hysteresis comparing module 4. A second current source 51b receives the second output signal $V_{o1}$− generated by the hysteresis comparing module 4.

According to an embodiment, the first current source 51a comprises a PMOS transistor 510 and the second current source 51b comprises an NMOS transistor 511.

The PMOS transistor 510, biased by a constant gate voltage $V_{pch}$, is activated by signal Vo1+ and the NMOS transistor 511, biased by a constant gate voltage $V_{nch}$, is activated by signal Vo1−. Biases $V_{pch}$ and $V_{nch}$ set the charge up and down rate of an holding capacitor 50.

Of course, the first and second current sources may comprise a transistor of a different type. Or, they may comprise a different structure performing the same function.

In the described embodiment, the first output signal $V_{o1}$+ is applied to the source 510s of the PMOS transistor 510 and the second output signal $V_{o1}$− is applied to the source 511s of the NMOS transistor 511.

The drain of the PMOS transistor 510 is connected to the drain 511d of the NMOS transistor 511, the drain 510d, 511d of both transistors 510, 511 being connected to a first terminal 50a of the capacitor 50. The second terminal 50b of the capacitor 50 is connected to a reference power voltage.

The first current source 51a is activated by the first output signal $V_{o1}$+ and the second current source 51b is activated by the second output signal $V_{o1}$−.

Thus, when the first output signal $V_{o1}$+ is at an active state, the first current source 51a is activated.

Similarly, when the second output signal $V_{o1}$− is at an active state, the second current source 51b is activated.

The voltage stored by the holding capacitor 50 depends in the state of output signals $V_{o1}$+, $V_{o1}$− from the hysteresis comparing module 4.

The capacitor 50 is charged up or charged down by one of the current sources 51a, 51b.

When the state of any of the output signals $V_{o1}$+, $V_{o1}$− is a hold state, the voltage in the holding capacitor 50 remains constant. When the state is a charge-up state, the voltage in the holding capacitor 50 increases, for example at a constant rate. The holding capacitor 50 is charged by a positive charging current coming from the first current source 51a. When the state is charge-down state, the holding capacitor 50 is discharged by a negative current coming from the second current source 51b.

It may be noted that if the amplified signal $V_o$ does not pass one of the thresholds values θo+, θo−, the output signal is at a hold state.

If light increases such that the first θo+ is reached, the first current source 50a is activated (charge up state) making the voltage in the holding capacitor (VqDC) increase at a constant speed. This will make the amplified signal $V_o$ goes down until the reference value ($V_{ref}$) is reached. At this instant the 'hold state' is returned to. Symmetric behavior occurs when light decreases, making the output signal be in the charge-down state.

The feedback control module 5 further comprises an amplifier 52 connected between the capacitor 50 and an output 5c generating the control signal $V_{qDC}$ of the voltage amplifier 3.

When the pixel circuit 1 has been reset, i.e. when the amplified signal $V_o$ reaches the reference value, for example 0, and the light intensity increases at the pixel circuit 1, the signal representing the light intensity $V_{ph}$ increases.

Thus, in the described embodiment, the differential input of the hysteresis comparator 40, corresponding to the amplified signal $V_o$, decreases progressively. If the amplified signal $V_o$ or differential input, of the hysteresis comparator 40 reaches the first threshold value θo+, the hysteresis comparator 40 sets the first output signal $V_{o1}$+ to an active state.

In the described embodiment the amplifier module 3 has an odd number of stacks of diodes. It should be noted that if the amplifier stage 3 has an even number of stacks, the amplified signal would be reversed, since each stack inverts the voltage.

The first output signal $V_o$+, $V_{o1}$+ being in an active state, the first source 51a is activated. In the described embodiment, the PMOS transistor 510 is activated by means of voltage $V_{o1}$+. The capacitor 50 is charged and the control signal $V_{qDC}$ progressively increases.

The increase in control signal $V_{qDC}$ makes the input DC offset of the voltage amplifier 3 progressively increase, and that means that the amplified signal $V_o$ progressively decreases until it exceeds the reference value (for example zero). At this instant, the hysteresis comparator 40 sets the first output signal $V_o$+ to a low or inactive state.

It may be noted that when the first output signal $V_o$+ is in a low or inactive state, the first source 51a is no longer activated and the capacitor 50 maintains its charge level until the amplified signal $V_o$ reaches either the first threshold value θo+ or the second threshold value θo−.

If the light intensity decreases at the pixel circuit 1, the signal representing the light intensity $V_{ph}$ decreases. Thus, the differential input or amplified signal $V_o$ of the hysteresis comparator 40 increases progressively. If the amplified signal $V_o$ or differential input of the hysteresis comparator 40 reaches the second threshold value θo−, the hysteresis comparator 40 sets the second output signal $V_o$−, $V_{o1}$− to an active state.

When the second output signal $V_o$−, $V_{o1}$− is in an active state, the second source 51b is activated. In the described embodiment, the NMOS transistor 511 is activated by means of voltage $V_{o1}$−. The capacitor 50 is thus charged and the control signal $V_{qDC}$ progressively decreases.

The decreasing control signal $V_{qDC}$ makes the input DC offset of the voltage amplifier 3 progressively decrease, and that means that the amplified signal $V_o$ progressively increases until it exceeds the reference value (for example zero). At this instant, the hysteresis comparator 40 sets the second output signal $V_o$+ to a low or inactive state.

It may be noted that when the second output signal $V_o$− is in a low or inactive state, the second source 51b is no longer activated and the capacitor 50 maintains its charge level until the amplified signal $V_o$ reaches either the first threshold value θo+ or the second threshold value θo−.

It may be noted that the gate voltages $V_{pch}$, $V_{nch}$ of the PMOS 510 and NMOS 511 transistors of the feedback control module 5 are set to predetermined values by bias circuits which may be shared by a plurality of pixel circuits.

The invention claimed is:

1. Pixel circuit for detecting time-dependent visual data comprising a photo sensing device detecting a light intensity and generating a signal representing the detected light intensity, said pixel circuit comprising:
   a voltage amplifier (3) configured for amplifying the signal representing the detected light intensity ($V_{ph}$) and generating an amplified signal ($V_o$), the amplified signal being generated by taking into account a control signal ($V_{qDC}$) which shifts an input voltage offset of said voltage amplifier,
   a hysteresis comparing module (4) configured for comparing the amplified signal ($V_o$) to at least one threshold value ($\theta o+$, $\theta o-$) and to a reference value ($V_{ref}$) and for generating at least one output signal ($V_o+$, $V_o-$;, $V_{o1+}$, $V_{o1-}$) based on said comparison, and
   a feedback control module configured for generating said control signal ($V_{qDC}$) of said voltage amplifier (3) based on said at least one output signal generated by said hysteresis comparing module.

2. The pixel circuit according to claim 1, wherein said hysteresis comparing module (4) is configured for setting said at least one output ($V_o+$, $V_o-$; $V_{o1+}$, $V_{o1-}$)) to an active state if said amplified signal exceeds said at least one threshold value ($\theta o+$, $\theta o-$).

3. The pixel circuit according to claim 2, wherein when said at least one output ($V_0+$, $V_o-$; $V_{o1}+$, $V_{o1}-$) is at an active state, said feedback control module is configured for modifying said control signal ($V_{qDC}$) such that said amplified signal ($V_0$) reaches said reference value ($V_{ref}$).

4. The pixel circuit according to claim 2, wherein said active state is a charge-up state if said amplified signal ($V_o$) exceeds a first threshold value ($\theta o+$) or if said amplified signal ($V_o$) exceeds a second threshold value ($\theta o-$).

5. The pixel circuit according to claim 2, wherein said active state is a charge-down state if said amplified signal ($V_o$) exceeds a second threshold value ($\theta o-$) or if said amplified signal ($V_o$) exceeds a first threshold value ($\theta o+$).

6. The pixel circuit according to claim 1, wherein said feedback control module (5) comprises a capacitor (50) which is charged depending on the at least one output signal ($V_o+$, $V_o-$; $V_{o1+}$, $V_{o1-}$), said control signal ($V_{qoc}$) of the voltage amplifier (3) being generated as a function of the charge of said capacitor (50).

7. The pixel circuit according to claim 6, wherein said feedback control module comprises at least a current source ($51a$, $51b$) which is activated by the at least one output signal ($V_o+$, $V_o-$; $V_{o1+}$, $V_{o1-}$), said capacitor (50) being charged by said at least one current source ($51a$, $51b$).

8. The pixel circuit according to claim 1, wherein said voltage amplifier (3) comprises at least a first and a second stack of transistors (30, 31) each formed by a plurality of diode-connected transistors ($M_{pij}$) and an additional transistor ($M_{nij}$), the additional transistor ($M_{nij}$) of said first stack of transistors (30) receiving said signal representing the light intensity ($V_{ph}$) and the amplified signal ($V_o$) being taken from a terminal of the additional transistor ($M_{nij}$) of said second stack of transistors (31).

9. The pixel circuit according to claim 1, wherein said voltage amplifier (3) comprises a plurality of stacks of transistors (30, 31, 32) formed respectively by a plurality of diode-connected transistors ($M_{pij}$) and an additional transistor ($M_{nij}$), the additional transistor ($M_{nij}$) of a first stack of transistors (30) receiving said signal representing light intensity ($V_{ph}$) and the amplified signal ($V_o$) being taken from a terminal of the additional transistor ($M_{nij}$) of a second stack of transistors (31) and a third stack of transistors (32) respectively.

10. The pixel circuit according to claim 1, wherein said photo-sensing device (2) comprises a photodiode (20) generating a current ($I_{ph}$), and a logarithmic converter (21) configured for transforming said current ($I_{ph}$) into said signal representing the detected light intensity ($V_{ph}$).

11. The pixel circuit according to claim 1, wherein said hysteresis comparing module (4) comprises at least a hysteresis comparator (400, 401 ; 40), said at least one output signal ($V_o+$, $V_o-$) corresponding to an output of said hysteresis comparator.

12. The pixel circuit according to claim 1, wherein said hysteresis comparing module (4) comprises at least a hysteresis comparator (400, 401) and a logic module (41), said at least one output signal ($V_o+$, $V_o-$) corresponding to an output of said logic module (41).

13. The pixel circuit according to claim 1, wherein said hysteresis comparing module (4) comprises a first hysteresis comparator (400) and a second hysteresis comparator (401), the first hysteresis comparator being configured for comparing the amplified signal ($V_o$) to a first threshold value ($\theta o+$) and generating based on said comparison a first output signal ($V_o+$; $V_{o1+}$) at an active state if the level of the amplified signal is equal or greater than the first threshold value ($\theta o+$), and the second hysteresis comparator (401) being configured for comparing the amplified signal ($V_o$) to a second threshold value ($\theta o-$) and generating a second output signal ($V_o-$, $V_{o1-}$) at an active state if the level of the amplified signal ($V_o$) is equal or lower than the second threshold value ($\theta o-$).

14. The pixel circuit according to claim 13, wherein said feedback control module (5) comprises two current sources ($51a$, $51b$) which are respectively activated based on said first output signal ($V_{o1+}$) and said second output signal ($V_{o1-}$).

15. A vision sensor comprising a plurality of pixel circuits (1) according to claim 1.

16. The pixel circuit according to claim 3, wherein said active state is a charge-up state if said amplified signal exceeds a first threshold value or if said amplified signal exceeds a second threshold value.

17. The pixel circuit according to claim 3, wherein said active state is a charge-down state if said amplified signal exceeds a second threshold value or if said amplified signal exceeds a first threshold value.

18. The pixel circuit according to claim 4, wherein said active state is a charge-down state if said amplified signal exceeds a second threshold value or if said amplified signal exceeds a first threshold value.

19. The pixel circuit according to claim 2, wherein said feedback control module comprises a capacitor which is charged depending on the at least one output signal, said control signal of the voltage amplifier being generated as a function of the charge of said capacitor.

20. The pixel circuit according to claim 3, wherein said feedback control module comprises a capacitor which is charged depending on the at least one output signal, said control signal of the voltage amplifier being generated as a function of the charge of said capacitor.

* * * * *